Figure 1:
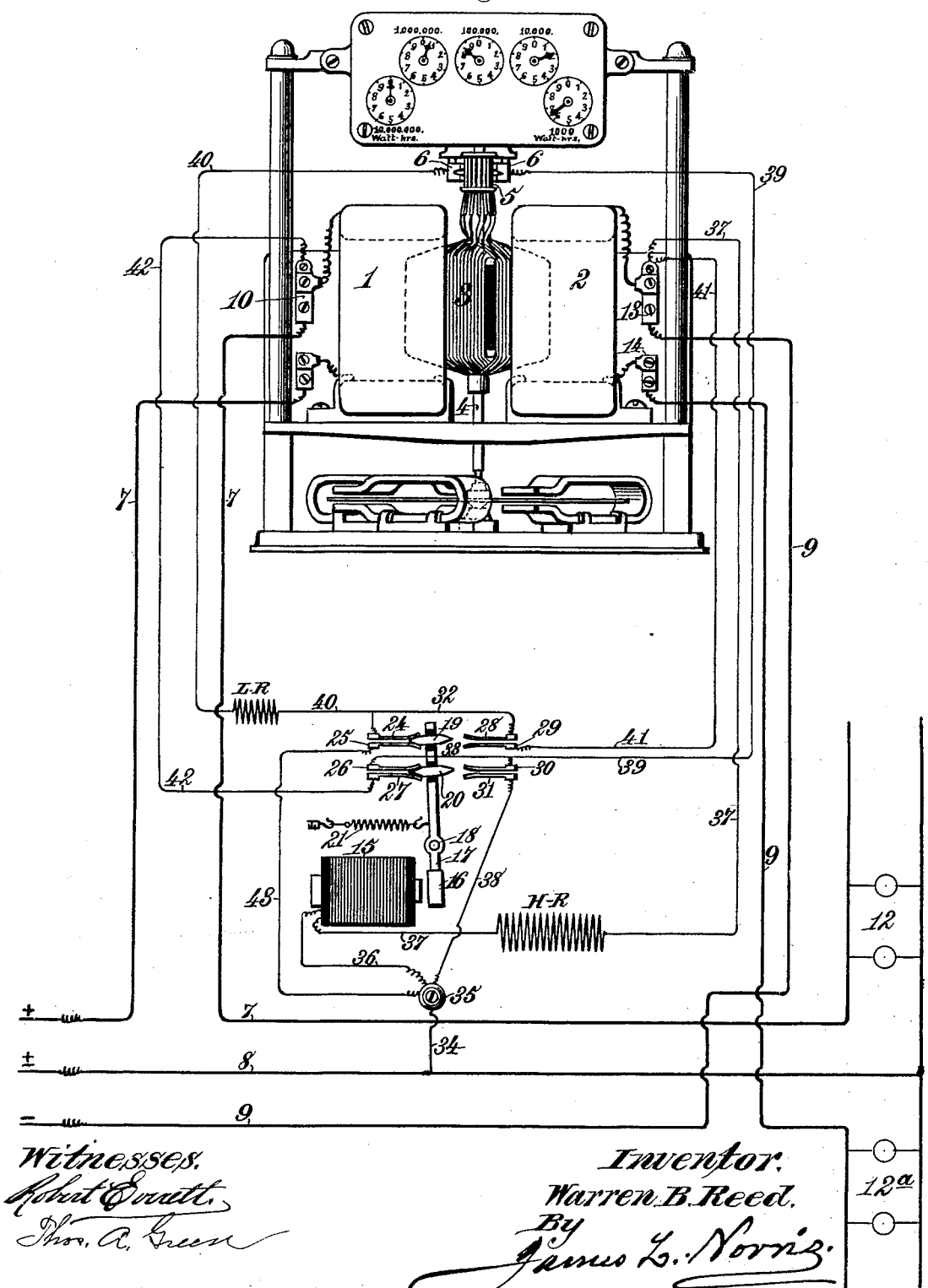

(No Model.) 2 Sheets—Sheet 2.
W. B. REED.
ELECTRIC METER.

No. 521,089. Patented June 5, 1894.

Witnesses.
Robert Ewett
Thos. A. Green

Inventor:
Warren B. Reed.
By
James L. Norris.
Atty.

UNITED STATES PATENT OFFICE.

WARREN B. REED, OF NEW ORLEANS, LOUISIANA.

ELECTRIC METER.

SPECIFICATION forming part of Letters Patent No. 521,089, dated June 5, 1894.

Application filed February 13, 1894. Serial No. 500,052. (No model.)

*To all whom it may concern:*

Be it known that I, WARREN B. REED, a citizen of the United States, residing at New Orleans, in the parish of Orleans and State of Louisiana, have invented new and useful Improvements in Electric Meters, of which the following is a specification.

My invention relates to electric meters for measuring and registering the consumption of current upon lamp-circuits by means of an electric motor the speed of which is variable in proportion to the varying consumption of the current.

It is my purpose to provide and combine with a meter of the type mentioned means whereby the latter may be used in connection with the regular, three-wire Edison circuit with correct indications under both normal and abnormal conditions. In other words, it is my purpose to so improve this type of meter that, should the safety-fuse, or plug, "blow" upon either of the wires which feed the lamps, or should the lamps on either wire be turned off, the operation of the meter will not be interrupted, or its accuracy impaired.

My invention consists in certain features of construction and arrangements and combinations of parts fully described and claimed hereinafter and shown in the drawings accompanying this specification, in which—

Figure 2:
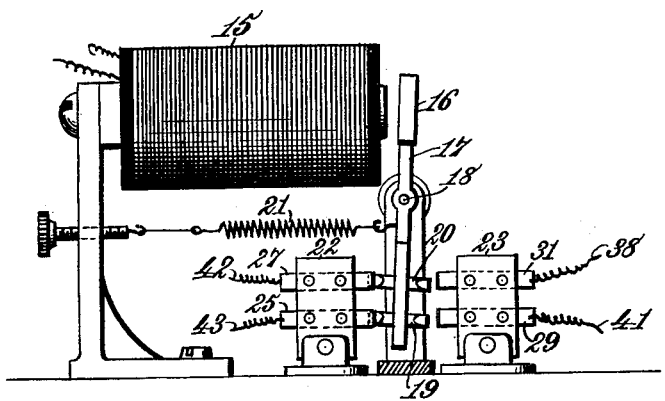
Figure 3:
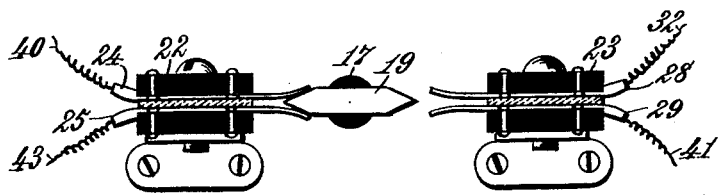

Figure 1 is a diagram showing, conventionally, the essential parts of a current meter of the type hereinbefore mentioned, connected, in accordance with my invention, with an ordinary three wire lamp-circuit. Fig. 2 is a sectional side elevation, showing the electrically operated devices which are connected in the meter circuit and by the operation of which, under the different conditions possible, the armature circuit is maintained upon the live side of the system without reversing the direction of the current through the armature. Fig. 3 is a horizontal section upon a line passing through the armature-lever and the two insulations shown in Fig. 2.

The type of meter I have illustrated in this application is substantially the same as that shown and described in the Letters Patent granted to Elihu Thomson the 24th day of March, 1891, No. 448,894, although my invention is not necessarily restricted to the construction and arrangement of parts shown in said patent. As the type shown is well known to those skilled in the art, I have shown only the essential parts thereof in the drawings, in which the reference-numerals 1 and 2 indicate the field-coils of the electric motor, and the numeral 3 denotes the rotating armature, mounted upon a shaft 4, from which movement is communicated to the train of registering gearing. Upon the armature shaft 4 is mounted the commutator 5, upon which the brushes 6 have bearing in the ordinary manner.

The reference-numerals 7, 8 and 9 indicate respectively, the positive, neutral, and negative wires of the system, but these terms are merely relative, and have reference only to the meter, as connected. The meter may be connected in reverse order and the wires 7 and 9 may be respectively negative and positive without affecting the results obtained by my invention. The positive wire 7 carries the current to the field-coil 1 and a continuation of the same wire is led from the out-going terminal of said field-coil to a binding post 10 and thence to the lamp-circuits 12 and 12ª which are connected in multiple arc, in the usual manner. The negative wire 9 is led to a binding-post 13 and thence to the field-coil 2, to the out-going terminal of which a continuation of said wire is connected and led to a binding-post 14 and thence to the lamp-circuit. The neutral wire 8 differs in arrangement from all systems heretofore used, inasmuch as it enters the meter in the manner fully described hereinafter.

At any suitable point is arranged an electro-magnet 15, provided with an armature 16, which is mounted upon a lever 17, the latter having its fulcrum 18 located between the armature and the other end of said lever, upon which are mounted two wedge-shaped contacts 19 and 20, insulated from each other. A spring 21 draws the armature away from the poles of the electro-magnet 15, whenever current ceases to flow through its coils, thereby vibrating the contacts 19 and 20 through a short arc. At the two extremities of this arc of vibration are arranged insulations 22 and 23 of any suitable form, in or upon which are mounted clips, or diverging contacts, which are adapted to receive the wedge-shaped contacts 19 and 20, the construction being similar to that of the ordinary knife-switch. Upon the insulation 22 are mounted clips 24 and 25, insulated from each other but so arranged that one wedge-shaped extremity of the contact 19 may enter between and make electrical contact with both. At a suitable point upon the same insulating support 22 are mounted two similar clips 26 and 27, so arranged that the wedging end of the contact 20 may enter between them and make electrical contact with both, at the same time that the contact 19 engages the clips 24 and 25. In like manner, clips 28 and 29 are arranged upon the insulation 23 in such position as to engage the contact 19, and similar clips 30 and 31 are so placed as to engage the contact 20. The contacts 19 and 20 will engage with the clips 24—25 and 26—27, respectively, whenever the armature 16 being released by the electro-magnet 15, is drawn away from the latter by the spring 21. On the other hand, the instant that a current flows through the coils of the electro-magnet 15, the armature 16 will be attracted and the contacts 19 and 20 will engage the clips 28—29 and 30—31, respectively, the engagement continuing as long as the armature is held by the attraction of the energized magnet. A bridge-wire 32 connects the clip 24, on one insulation 22, with the clip 28 upon the opposite insulation 23, and a similar connection is made between the clips 26 and 30, by means of a bridge-wire 33. The circuit of the electro-magnet 15 is normally supplied from the negative side of the system, through a circuit leading from the neutral wire 8 by a wire 34 to a binding-post 35, thence by a wire 36 to the first terminal of the coil of said magnet, the circuit being completed by a wire 37 from the second terminal to the binding-post 13 and thence to the negative wire 9. A high resistance H—R, of about two thousand ohms is interposed in this circuit so that the current strength in the coil of the magnet is about one-twentieth of an ampère, at one hundred and ten volts, or five and five tenths watts. The armature circuit is normally made, also, from the negative side of the system, through the wire 34 which is led from the wire 8 to the binding-post 35, thence, the magnet 15 being in circuit, through the wire 38, clip 31, contact 20, clip 30 and wire 39, to one of the brushes. From the other brush of the commutator a wire 40 is led to the clip 24, and the normal circuit of the armature is completed by the bridge wire 32, clip 28, contact 19, clip 29 and wire 41 to the negative wire 9, a low resistance L R, having a strength of about one thousand ohms is interposed in the wire 40, so that the armature circuit receives about one tenth of an ampère, at one hundred and ten volts, or eleven watts.

Under the arrangement thus far described, it will be observed that, under normal conditions, the armature circuit and the circuit of the electro-magnet 15 are both fed from one and the same side of the system. It is evident nevertheless, that if the negative wire should break, or if the fuse, or safety-plug, should "blow," no current will be supplied to the circuit of the magnet 15, and the latter ceasing to attract the armature 16, the spring 21 will throw the contacts 19 and 20 from the negative side over to the positive side of the system, where said contacts will engage with clips 24—25, and 26—27, respectively. Under these conditions, the armature circuit must be fed from the positive side, for which purpose a shunt is provided, consisting of a wire 42, carried from the binding-post 10 to the clip 27, through the contact 20, clip 26, bridge 33, clip 30, and wire 39 to the armature, and thence by wire 40 through low resistance L R, to clip 24, contact 19, clip 25, wire 43, to binding-post 35, and thence, by wire 34 to the neutral wire 8. Should the safety-fuse blow on the positive wire 7, the normal circuits for the armature and electro-magnet 15 will not be affected, as is evident from the diagram. In either of the contingencies mentioned, it is evident that the armature circuit will always be fed at one hundred and ten volts, and that its current will always be in the same direction. As it passes, in either case, through the low resistance L R, the armature circuit will always receive about one tenth of an ampère, at one hundred and ten volts, or eleven watts. As the armature-circuit consumes eleven watts and the circuit of the electro-magnet 15, five and five tenths watts, the total consumption of the meter will be sixteen and five tenths watts. As heretofore constructed the meter took one tenth of an ampère at two hundred and twenty volts, or twenty-two watts.

Heretofore, and prior to my invention, the neutral wire has not been connected in the meter circuits and the circuit of the armature has been in a shunt, of comparatively high resistance, from the binding-post 10 to the binding-post 14. The voltage between these points being two hundred and twenty volts, and the resistance about two thousand ohms, the armature received about one-tenth of an ampère of current at two hundred and twenty volts, as already stated. Under such conditions the blowing of the fuse in the positive wire, deprived the field-coil 1 of current, but left the field-coil 2 unchanged. The armature circuit got, therefore, about one-twentieth of an ampère of current which is derived from the current supplying the lamps $12^a$, a portion of which passes through the lamps 12 to the binding-post 10 and thence, through the armature-circuit, to the binding-post 14. This current being at one hundred and ten volts, instead of two hundred and twenty, the armature received only one-twentieth of an ampère and therefore turned at half its normal speed. Now if the keys of the lamps 12 are turned off, under these conditions, the armature receives no current, and the meter ceases to register, although the lamps 12ª continue to burn. Thus, it will be seen that the consumer can burn half its whole number of lamps at an expense of one half what he ought to pay, or at no cost whatever. The same thing happens if the fuse in the negative wire blows. By my invention these objections are wholly avoided, as the armature receives a constant current under all the conditions referred to and the meter is made reliable thereby.

What I claim is—

1. In a three wire system of electric lighting, the combination with an electric meter, of an electric motor, an armature and armature circuit, normally fed from one side of the system, a shunt circuit connected with the other side and with the neutral wire, and an armature-lever carrying contacts by which the armature circuit is automatically closed upon the live side of the system under all conditions, substantially as described.

2. In a three wire system of electric lighting, the combination with an electric meter, of an electric motor, an armature and armature-circuit normally fed from the negative side of the system, a shunt circuit connected with the positive side and with the neutral wire of the lamp-circuit, and an armature-lever carrying contacts by which the armature circuit is automatically closed upon the live side of the system, substantially as described.

3. In a three wire system of electric lighting, the combination with an electric meter, of an electric motor, an armature-circuit fed from one side of the system a shunt circuit connected with the other side and with the neutral wire of the lamp-circuit, an armature-lever carrying contacts by which the armature-circuit is made upon the live side of the system, and an electro-magnet fed from one side of said system through a circuit of high resistance and holding the armature lever in position to close the armature circuit, substantially as described.

4. In a three wire system of electric lighting, the combination with an electric meter, of an electric motor, an armature and armature circuit normally fed from the negative side of the system through a low resistance, a shunt connected with the positive side and with the neutral wire of the lamp-circuit, an armature-lever carrying contacts adapted to close the armature circuit through either the negative side or the shunt, and an electro-magnet normally attracting the armature on said lever, substantially as described.

5. In a three wire system of electric lighting, the combination with an electric meter of an electric motor, an armature and an armature circuit of low resistance normally fed from the negative side of the system, a shunt connected with the positive side and with the neutral wire, an armature-lever having contacts adapted to close the circuit of the armature either on the negative or on the positive side, and an electro-magnet lying in a circuit of high resistance which is fed from the negative side, to close the normal armature-circuit, substantially as described.

6. In a three wire system of electric lighting, the combination with an electric meter, of an electric motor having field-coils fed from opposite sides of the system, an armature and armature-circuit of low resistance normally fed from one side only of said system, a shunt connected with the opposite side and with the neutral wire of the lamp-circuit, an armature-lever carrying contacts adapted to close the armature circuit through either side, separately, and an electro-magnet lying in a circuit of high resistance which is fed from the negative side and through the neutral wire, to hold the armature in position to close the normal circuit of the armature of the motor, substantially as described.

7. In a three wire system of electric lighting, the combination with an electric meter of an electric motor, an armature and armature-circuit, an electro-magnet, an armature for the same having contacts which close the armature circuit on the live side of the system, and a wire from the neutral wire normally supplying both the armature circuit and the circuit of the electro-magnet, substantially as described.

8. In a three-wire system of electric lighting, the combination with an electric meter of an armature-circuit supplied from the live side of the system, normally by the neutral wire which enters the meter, a low resistance interposed in said circuit, a shunt from the positive side, and means for automatically closing the armature circuit through said shunt, in the same direction, substantially as described.

9. In a three-wire system of electric lighting, the combination with an electric meter of an electric motor, an armature-circuit normally fed by the neutral wire, which enters the meter, a low resistance interposed in the armature-circuit, a shunt from the positive side of the system, a spring retracted armature lever having contacts adapted to close the armature circuit in the same direction on the live side of the system, an electro-magnet to attract said armature lever and close the normal armature circuit, and a circuit of high resistance for said electro-magnet, substantially as described.

10. In a three-wire system of electric lighting, the combination with an electric meter, of an electric-motor having a rotating armature and field coils, the latter being supplied from the positive and negative sides of the system, respectively, and an armature circuit fed normally from the neutral wire which enters the meter, substantially as described.

11. In a three-wire system of electric lighting, an electric-meter having two field-coils and a rotating armature, and an armature circuit, the field coils being supplied from the positive and negative wires, and the armature circuit from the neutral wire of the system, all of which wires enter said meter, substantially as described.

In testimony whereof I have hereunto set my hand and affixed my seal in presence of two subscribing witnesses.

WARREN B. REED. [L. S.]

Witnesses:
PATRICK HENRY FOLEY,
G. W. LOGAN, Jr.